UNITED STATES PATENT OFFICE.

LUTHER P. HARVEY, OF CHARLOTTE COURT HOUSE, VIRGINIA.

GRUBBING IMPLEMENT.

935,020.  Specification of Letters Patent.  Patented Sept. 28, 1909.

Application filed March 27, 1909. Serial No. 486,267.

*To all whom it may concern:*

Be it known that I, LUTHER P. HARVEY, a citizen of the United States, residing at Charlotte Court House, in the county of Charlotte and State of Virginia, have invented a new and useful Grubbing Implement, of which the following is a specification.

This invention relates to implements for pulling grubs; that is, stumps and roots of trees, bushes, saplings, etc., and its object is to provide an implement of this kind which is simple and strong in structure, efficient in operation, and easily handled.

With the foregoing objects in view the invention consists in a novel construction and arrangement of parts to be hereinafter described and claimed, reference being had to the drawing hereto annexed forming a part of this specification, in which drawing a perspective view of the implement is shown, illustrating the manner of its use.

In the drawings, 5 denotes the base of the implement, said base also serving as a fulcrum as will be presently described. The base may be a wooden board of suitable thickness, and it is of a length and width to form a firm support for the implement.

From the base 5 projects upwardly and outwardly in a curve, an arm 6, the outer end of which is curved downwardly as indicated at 7, and terminates in a fixed jaw 8 having its face serrated or roughened so as to obtain a better grip.

Coöperating with the jaw 8, is a movable jaw 9 which also has its face serrated or roughened. The movable jaw is formed integral with a shank 10 which is pivoted at 11 to the arm 6. The shank is formed with a tang which is secured in a slot made in a lever 12 whereby the jaw 9 is operated. The jaws are offset in order that the stump may be placed squarely between the jaws, and thus firmly gripped therebetween. When the jaws are in engagement with the stump, the latter extends to one side of the arm 6, and the jaws may thus be engaged without tilting the implement sidewise.

In order to strengthen the pivotal support of the movable jaw, I provide a strap 13 which is firmly riveted in the arm 6, and has an offset portion between which and the arm, the shank 10 works. The pivot 11 extends through this offset portion of the strap, and through the arm 6. The arm is braced by bars 14 connected at one end to opposite sides of the arm, and at their opposite end to the base 5 on the top thereof. The bars extend divergingly from the arm, and are connected to the base adjacent to the rear corners thereof. One of these bars is bolted on top of the strap 13.

The implement herein described is strong and well adapted to pull saplings up to a considerable size and it can also be easily operated. In use, the operator places the implement close to the sapling, stump, or bush to be pulled, with the base 5 resting on the ground, and the jaws engaging the stump or other part to be pulled. The lever 12 is then swung downwardly toward the operator, whereupon the jaws firmly grip the stump or other part, and it is pulled out of the ground with its roots, the entire implement swinging in the direction of the operator, the rear edge of the base serving as a fulcrum on which this swinging movement takes place. It will therefore be seen that the jaws serve merely to grip the stump, the pulling action being had by the herein-described swinging movement of the entire implement on the base. This arrangement removes all undue strain from the pivot 11 and renders the implement less liable to breakage when used on stumps and saplings of considerable size.

What is claimed is:

1. A grubbing implement comprising a base, an arm rigidly secured thereto, and extending in a curve upwardly and outwardly therefrom, a jaw at the end of the arm, a brace secured to the arm, a lever pivoted to the arm, the lever extending between the arm and the brace, and the pivot on the lever passing through said parts, and a jaw on the lever coöperating with the first mentioned jaw.

2. A grubbing implement comprising a base, an arm rigidly secured to the base, and extending in a curve upwardly and outwardly therefrom, a jaw at the end of the arm, a lever pivoted to the arm, a jaw on the lever coöperating with the first mentioned jaw, and braces secured at one end to the arm, and extending divergingly therefrom, and secured at their other end to the base.

In testimony that I claim the foregoing as my own, I have hereto affixed my signature in the presence of two witnesses.

LUTHER P. HARVEY.

Witnesses:
C. E. BEUSCHSTER,
F. C. THORNTON, Jr.